United States Patent [19]

Matsuhashi

[11] Patent Number: 5,475,932
[45] Date of Patent: Dec. 19, 1995

[54] SHAFT POSITION SENSOR

[75] Inventor: Akira Matsuhashi, Tachikawa, Japan

[73] Assignee: Metrol Co., Ltd., Tokyo, Japan

[21] Appl. No.: 122,305

[22] Filed: Sep. 17, 1993

[30] Foreign Application Priority Data

Sep. 24, 1992 [JP] Japan ................ 4-076383 U
Dec. 10, 1992 [JP] Japan ................ 4-359704

[51] Int. Cl.⁶ .................................... G01B 7/00
[52] U.S. Cl. .................................... 33/558; 33/561
[58] Field of Search .................... 33/556, 558, 559, 33/561

[56] References Cited

U.S. PATENT DOCUMENTS 2,384,519  9/1945  Aller ............................ 33/558
3,009,252  11/1961  Py ............................ 33/556
3,816,929  6/1974  Kiffe et al. ............................ 33/556

FOREIGN PATENT DOCUMENTS 3-65904  6/1991  Japan .

OTHER PUBLICATIONS

*Standard Dial and Limit Gauges*, Standard Gage Company, Catalog No. 6A, 1934, pp. 37, 39.

*Primary Examiner*—Alvin Wirthlin
*Attorney, Agent, or Firm*—Armstrong, Westerman, Hattori, McLeland & Naughton

[57]  ABSTRACT

The shaft position sensor is provided with a movable body fixed to a measuring shaft. A first switching apparatus operating in a first measuring position and a second switching apparatus operating in a second measuring position are incorporated in the movable body. The first switching means and the second apparatuses are arranged in parallel with the measuring shaft.

9 Claims, 12 Drawing Sheets

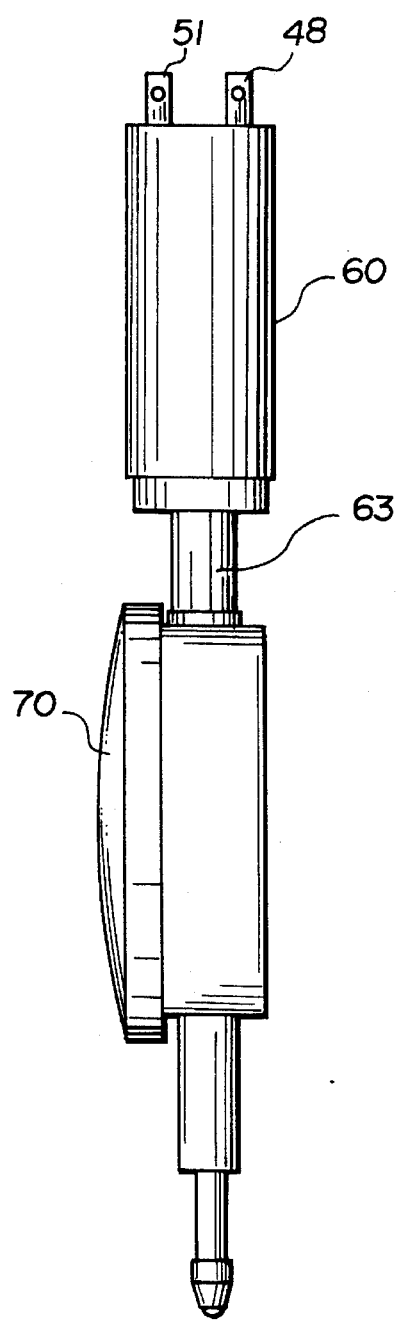
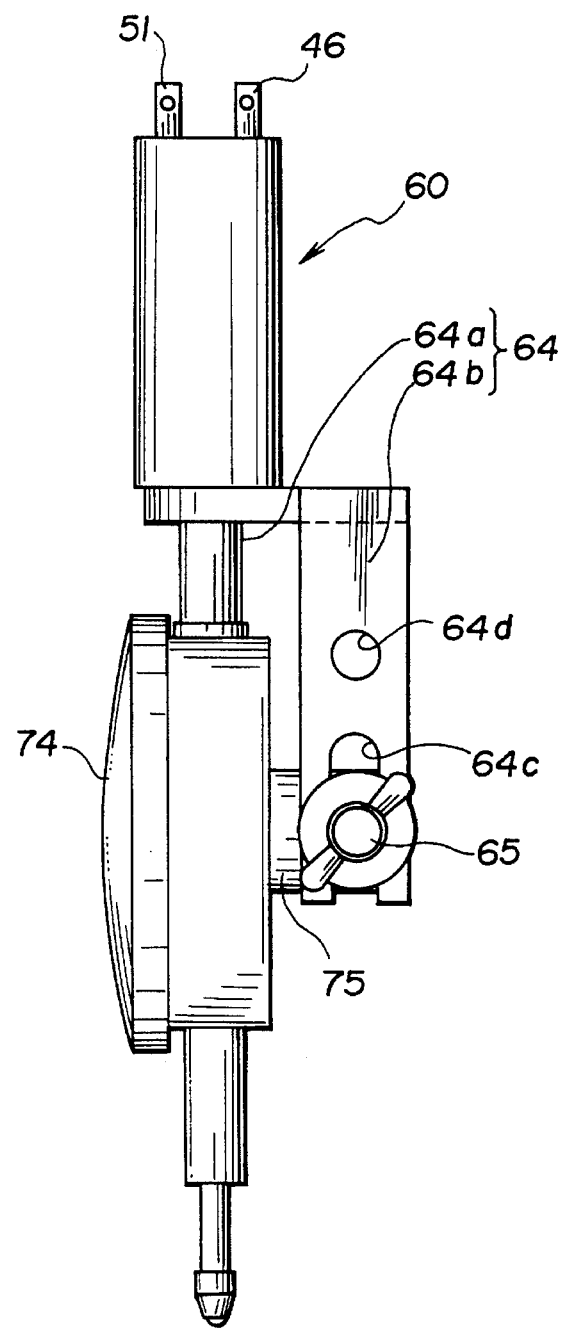

SHAFT POSITION SENSOR

BACKGROUND OF THE INVENTION

1. Field of the Invention

This invention relates to a shaft position sensor used to measure the dimensions of the shape of an object or to sense the displacement of the object.

2. Description of the Related Art

Generally, a shaft position sensor is used to measure the length and dimensions of an object or to sense the displacement of the object. Such as shaft position sensor, is (mentioned in the unexamined publication of Japanese Utility Model Application, No. 65904/1991) by the present inventor.

The above described shaft position sensor shall be explained with reference to the drawings. FIG. 17 is a vertically sectioned view showing the structure of a conventional shaft position sensor.

As shown in FIG. 17, a shaft position sensor 1 is provided with a housing 2 which is provided in the bottom with a shank 2a integrally connected with the housing 2. The shank 2a comprises a cylindrical member projecting outward of the housing 2 coaxially with the axis of the housing 2. A screw part 2b is formed at the tip of the shank 2a. A groove 2c extending in the axial direction of the shank 2a is formed in the outer peripheral part of the shank 2a.

A measuring shaft 3 is contained within the housing 2, and comprises a shaft member extending coaxial 1y with the axis of the housing 2, projects at the tip out of the housing 2 through the shank 2a and is provided at the tip with a contactor 4 to be in contact with an object to be measured.

The measuring shaft 3 is fitted with an insulatable rectangular parallelepiped movable body 5 which is provided with a hole 5a extending coaxially with the axis of the measuring shaft 3. The measuring shaft 3 is inserted through the hole 5a. A hole 5b extending coaxially with the axis of the hole 5a is provided in the peripheral part of the hole 5a of the movable body 5.

A ring-like fixed contact member 6 is fitted in an opening on one side of the hole 5b of the movable body 5 and a ring-like fixed contact member 7 is fitted in an opening on the other side of the hole 5b. The respective fixed contact members 6 and 7 are electroconductive and have lead wires 8 and 9 respectively connected to them. The respective lead wires 8 and 9 are bundled into one bundle and are then led out of the housing 2 as a connecting line 10.

Two spherical movable contact members 11 and 12 are respectively movably inserted into the hole 5b of the movable body 5. A spring member 13 is arranged between the movable contact members 11 and 12 and comprises an electroconductive spring member. The movable contact member 11 is pressed against the fixed contact member 6 by the spring force of the spring member 13 and the movable contact member 12 is pressed against the fixed contact member 7 by the spring force of the spring member 13. The movable contact member 11 constitutes a first switching means in cooperation with the fixed contact member 6 and the movable contact member 12 constitutes a second switching means in cooperation with the fixed contact member 7.

A spring member 14 is arranged between the movable body 5 and the upper part of the housing 2. The spring member 14 presses the movable body 5 toward the lower part of the housing 2 with its spring force.

The housing 2 is fitted with a push pin 15 for adjusting the contact position of the movable contact member 11 and fixed contact member 6 and a push pin 16 for adjusting the contact position of the movable contact member 12 and fixed contact member 7. The push pin 15 is provided in the bottom of the housing 2 so that its tip may be opposed to the movable contact member 11. An insulating member 17 is inserted between the push pin 15 and the bottom of the housing 2.

On the other hand, the push pin 16 is screwed into a screw hole (not illustrated) provided in the upper part of the housing 2. The displacement of the tip of the push pin 16 is regulated with the screwing of the push pin 16 with the above mentioned screw hole. The push pin 16 is made of an insulating member and is provided with a grip 16a for making its rotating operation easy. The displacement of the push pin 16 is set so as to adjust the signal generating point for the displacement of the measuring shaft 3.

A guide member 18 is fitted to the bottom of the housing 2 and comprises a member rising on the axis within the housing 2 and slidably fitted in a groove (not illustrated) formed on the side surface of the movable body 5.

A bracket 19 for holding the housing 2 with a supporter (not illustrated) of an outside device is fitted to the shank 2a of the housing 2 and is provided at the end with a hole 19a for receiving the shank 2a and a screw hole 19b communicating with the hole 19a and extending in the direction intersecting at right angles with the axis of the hole 19a.

A spring member 20 is held between the bracket 19 and the bottom of the housing 2. A nut 21 is screwed to the screw part 2b of the shank 2a.

A bolt 22 is screwed in the screw hole 19b of the bracket 19 and is positioned at the tip within the groove 2c of the shank 2a.

Now, the operation of the above described shaft position sensor 1 shall be explained with reference to the drawings. FIG. 18 is a view showing the first operating state of the shaft position sensor of FIG. 17. FIG. 19 is a view showing the second operating state of the shaft position sensor in FIG. 17.

First of all, as shown in FIG. 17, the bracket 19 of the shaft position sensor 1 is fixed to the supporter. Then, the adjusting operation before starting the measurement is made. This adjusting operation includes the adjustment of the distance between the tip of push pin 15 and the movable contact member 11 and the adjustment of the distance between the tip of the push pin 16 and the movable contact member 12. In the adjustment of the distance between the tip of push pin 15 and the movable contact member 11, the nut 21 is rotated after the conductor 4 is contacted with a guage(not illustrated) having a reference dimension of a lower limit. As the tip of the bolt 22 is positioned within the groove 2c of the shank 2a, with the rotation of the nut 21, the shank 2a, that is to say, the push pin 15 will be moved in the axial direction of the measuring shaft 3 and the contact position of the fixed contact member 6 with the movable member 11 will be found. The first position in which the fixed contact member 6 and the movable contact member 11 are separated from each other will be regulated by this distance adjustment.

In the adjustment of the distance between the tip of the push pin 16 and the movable contact member 12, after the contactor 4 is contacted with the gauge (not illustrated) having a reference dimension of an upper limit, the grip 16a of the push pin 16 is rotated and the distance between the tip of the push pin 16 and the movable contact member 12 is adjusted, that is to say, the contact position of the fixed contact member 7 with the movable contact member 12 will be found.

The measurement is started after the adjusting operation before starting the measurement is completed. When the measurement is started, that is to say, when the object to be measured and the contactor 4 are separated from each other, as shown in FIG. 17, the movable contact member 11 will be in contact with the push pin 15 and the movable contact member 11 and the fixed contact member 6 will be separated from each other. On the other hand, the movable contact member 12 will be in contact with the fixed contact member 7 by the spring force of the spring member 13 and therefore an open circuit will be formed between the lead wires 8 and 9 through the movable contact member 11, the spring member 13, the movable contact member 12 and the fixed contact member 7 from the fixed contact member 6.

Then, when the object to be measured relatively approaches the contactor 4 in the axial direction of the measuring shaft 3, the object and the contactor 4 will contact with each other. By the contact of the contactor 4 with the object to be measured, as shown in FIG. 18, the measuring shaft 3 will be pushed up together with the movable body 5 toward the upper part of the housing 2. With the movement of the movable body 5, the fixed contact member 6 will be moved toward the movable contact member 11. When the measuring shaft 3 reaches the first measuring position, the fixed contact member 6 and movable contact member 11 will be in contact with each other while the fixed contact member 7 and movable contact member 12 are held in contact with each other, that is to say, the first switching means will operate to close. Therefore, a closed circuit will be formed between the lead wires 8 and 9 through the movable contact member 11, the spring member 13, the movable contact member 12 and the fixed contact member 7 from the fixed contact member 6.

Further, when the measuring shaft 3 is pushed up to the second measuring position by the object to be measured, as shown in FIG. 19, the movable contact member 12 and the tip of the push pin 16 will be in contact with each other and the movement of the movable contact member 12 together with the measuring shaft 3 will be regulated. At the same time as the measuring shaft 3 exceeds the second measuring position, the movable contact member 12 will separate from the fixed contact member 7, that is to say, the second switching means will operate to open. Therefore, an open circuit will be formed between the lead wires 8 and 9 through the movable contact member 11, the spring member 13, the movable contact member 12 and the fixed contact member 7 from the fixed contact member 6.

In the above, when the measuring shaft 3 is pushed into the housing 2, a closed circuit will be formed in the first position and an open circuit will be formed in the second position.

However, because the fixed contact member 6, the movable contact member 11, the spring member 13, the movable contact member 12 and the fixed contact member 7 are arranged in parallel and series with the measuring shaft 3, the length in the vertical direction of the housing 2 will become so large that, when a large force is applied to the housing 2, a large moment will be generated in the bracket fitting position of the shank 2a. As a result, such position of the housing as the shank 2a will be likely to be damaged. In adjusting the measuring range, when the first position is adjusted by rotating the nut 21 and when the second position is adjusted by the push pin 16, as the position of operating the adjustment is divided into the upper part and lower part, the operation of adjusting the measuring range will be a trouble.

SUMMARY OF THE INVENTION

An object of the present invention is to provide a shaft position sensor wherein a housing will not likely be damaged when a large force is applied to the housing.

Another object of the present invention is to provide a shaft position sensor wherein the operation of adjusting the measuring range can be more simply made.

Another further object of the present invention is to provide a shaft position sensor wherein three or more shaft positions can be sensed.

Another further object of the present invention is to provide a shaft position sensor wherein a dial gauge can be fitted operatively connectably to the measuring shaft of the dial gauge.

The present invention is a shaft position sensor to be used to measure the dimensions of the shape of an object or to sense the displacement of the object, comprising a housing in which a bearing is provided, a measuring shaft projecting at the tip out of the above mentioned housing and slidably supported by the bearing of the above mentioned housing, an energizing means energizing the above mentioned measuring shaft toward its tip, a plurality of switching means operating to open or close in response to the displacement of the above mentioned measuring shaft and arranged in parallel along the periphery of the above mentioned measuring shaft and a switch operating position adjusting means for adjusting the position of operating to open or close the above mentioned switching means.

The above and further objects and novel features of the invention will more fully appear from the following detailed description when the same is read in connection with the accompanying drawings. It is to be expressly understood, however, that the drawings are for the purpose of illustration only and are not intended to define the limits of the invention.

BRIEF DESCRIPTION OF THE DRAWINGS

FIG. 5 is a view showing an example of the shaft position sensor in FIG. 1 as fitted to a dial gauge.

FIG. 7 is a view showing another example of the shaft position sensor in FIG. 1 as fitted to a dial gauge.

DETAILED DESCRIPTION OF PREFERRED EMBODIMENTS

The embodiments of the present invention shall be explained as follows with reference to the drawings.

Figure 1:
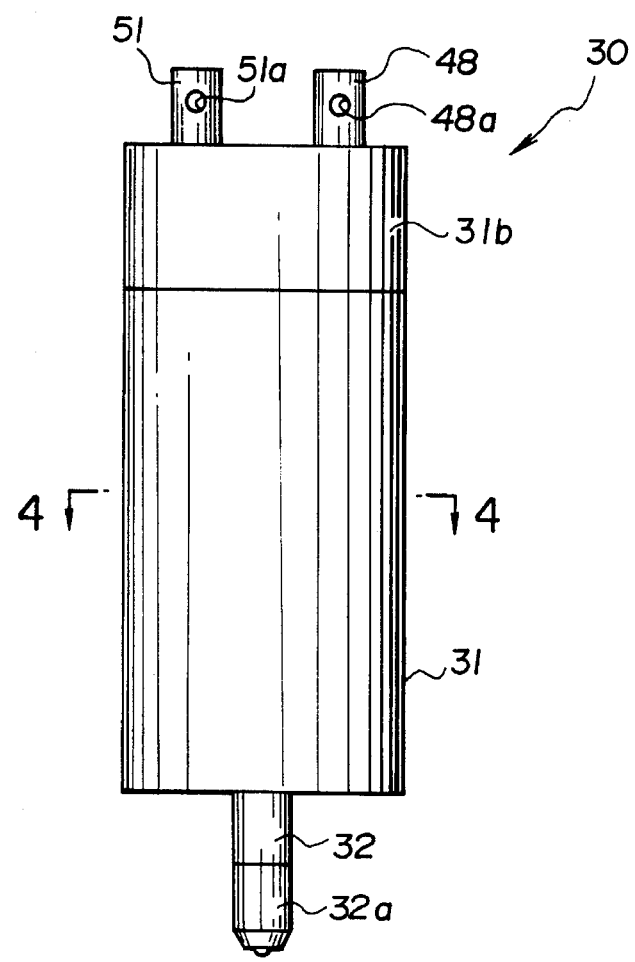
FIG. 1 is a side view showing an embodiment of a shaft position sensor of a preferred embodiment of the present invention.
Figure 2:
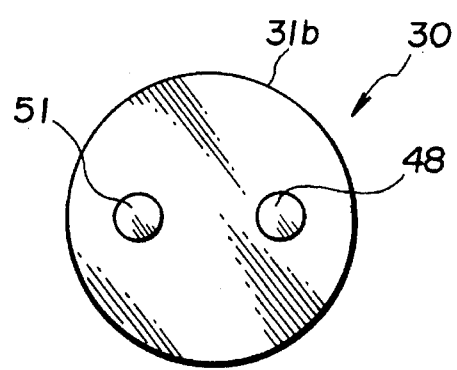
FIG. 2 is a back surface view showing the shaft position sensor in FIG. 1.
Figure 3:
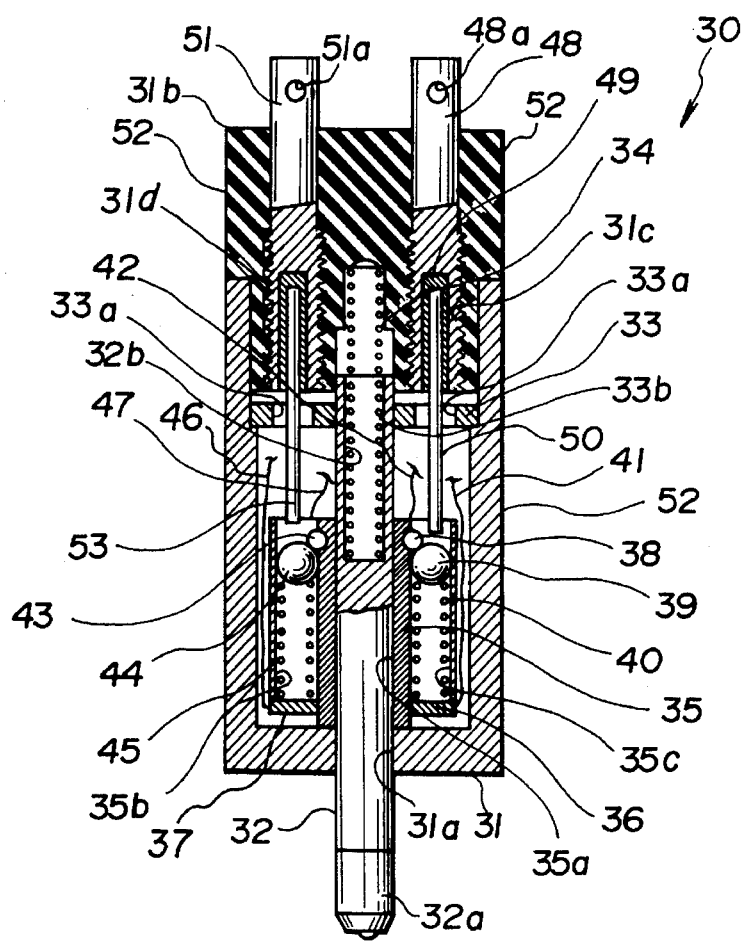
FIG. 3 is a vertically sectioned view showing the shaft position sensor in FIG. 1.
Figure 4:
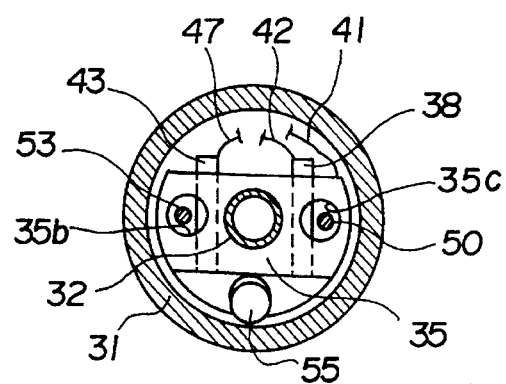
FIG. 4 is a sectioned view obtained on line 4—4 in FIG. 1.

FIG. 1 is a side view showing an embodiment of a shaft position sensor of the present invention. FIG. 2 is a back surface view showing the shaft position sensor in FIG. 1. FIG. 3 is a vertically sectioned view showing the shaft position sensor in FIG. 1. FIG. 4 is a sectioned view obtained on line 4—4 in FIG. 1.

As shown in FIGS. 1 to 4, a shaft position sensor 30 is provided with a housing 31 comprising a cylindrical member. The housing 31 is provided at one end with a hole 31a extending coaxially with the axis of the housing 31. The one end with the hole 31a of the housing 31 forms a first bearing. The opening at the other end of the housing 31 is covered with a lid member 31b. A pair of screw holes 31c, 31d extending in the axial direction of the hole 31a are provided in the lid member 31b. The respective screw holes 31c, 31d are so arranged as to be opposed to each other in the diametrical direction of the housing 31.

A measuring shaft 32 is contained in the housing 31, and comprises a shaft member extending coaxial 1y with the axis of the housing 31, projects at the tip out of the housing 31 through a hole 31a, and is provided at the tip with a contactor 32a. The measuring shaft 32 is provided with a hole 32b extending toward the tip from its rear end and is slidably supported in the axial direction of the housing 31 by the first bearing and a second bearing 33.

The second bearing 33 is provided with a pair of holes 33a opposed to each other in the diametrical direction and a hole 33b for receiving the measuring shaft 32. The second bearing 33 is fixed within the housing 31.

The measuring shaft 32 is pressed toward one end of the housing 31 by the spring force of a spring member 34. The spring member 34 is inserted at one end into a hole 32b and is at the other end in contact with the lid member 31b of the housing 31.

An substantially rectangular parallelepipedal insulating movable body 35 is fitted to the measuring shaft 32 and is provided with a hole 35a extending coaxially with the axis of the measuring shaft 32. The measuring shaft 32 is inserted through the hole 35a. The movable body 35 is prevented from rotating on its axis by a stopper 55.

Two holes 35b, 35c extending in parallel with the axis of the hole 35a are provided in the peripheral part of the hole 35a of the movable body 35. Each hole 35b, 35c is closed on one side of the housing 31 with electroconductive segmental lid members 36, 37, respectively.

A fixed contact member 38, a movable contact member 39 and a spring member 40 are contained in one hole 35c of the movable body 35. The fixed contact member 38 comprises an electroconductive bar-like member, is fixed to the inside wall defining one hole 35c and is arranged so that its axis may be in the tangential direction of the hole 35c. The movable contact member 39 is pressed against the fixed contact member 38 by the spring force of the spring member 40. The movable contact member 39 comprises a spherical member of a diametrical dimension smaller than the diametrical dimension of the hole 35b and is plated with gold on the surface.

The spring member 40 at one end is in contact with the movable contact member 39 and at the other end is in contact with the lid member 36. The lead wire 41 is connected to the lid member 36 and the lead wire 42 is connected to the fixed contact member 38. The first switching means is formed between the lead wires 41 and 42 and is formed of the fixed contact member 38, the movable contact member 39, the spring member 40 and the lid member 36.

The same as in hole 35c, a fixed contact member 43, a movable contact member 44 and a spring member 45 are contained in the other hole 35b of the movable body 35. The fixed contact member 43 comprises an electroconductive bar-like member, is fixed to the inside wall defining the hole 35b and is so arranged that its axis may be in the tangential direction of the hole 35b. The movable contact member 44 is pressed against the fixed contact member 43 by the spring force of the spring member 45. The movable contact member 44 comprises a spherical member of a diametrical dimension smaller than the diametrical dimension of the hole 35b and is plated with gold on the surface.

The spring member 45 at one end is in contact with the movable contact member 44 and at the other end is in contact with the lid member 36. A lead wire 47 is connected to the fixed contact 43. A second switching means is formed between the lead wire 41 connected to the lid member 36 and the lead wire 47 and is formed of the fixed contact member 43, movable contact member 44, spring member 45 and lid member 36.

An adjusting shaft 48 is screwed into one of screw holes 31c provided in the lid member 31b of the housing 31. A screw part (not illustrated) to be screwed into the screw hole 31c is formed on the outer periphery of the adjusting shaft 48. A push pin 50 is fixed through an insulating member 48 at one end of the adjusting shaft 48a and comprises an elongate bar-like member extending toward the movable contact member 39. The adjusting shaft 48 is provided at the other end with a hole 48a for receiving an adjusting tool.

The same as in one of the screw holes 31c, an adjusting shaft 51 is screwed into the other of the screw holes 31c provided in the lid member 31b. A screw part (not illustrated) to be screwed into the screw hole 31c is formed on the outer periphery of the adjusting shaft 51. A push pin 53 is fixed through an insulating member 52 at one end of the adjusting shaft 51 and comprises an elongate bar-like member extending toward the movable contact member 44. The adjusting shaft 51 is provided at the other end with a hole 51a for receiving an adjusting tool.

By the above, as the above mentioned first switching means and second switching means are arranged in parallel with each other, the length of the housing can be made small and the type can be made small.

Now, the operation of the shaft position sensor 30 shall be explained with reference to the drawings.

First of all, the shaft position sensor 30 is fixed to the supporter (not illustrated). Then, the adjusting operation before starting the measurement is made. In this adjusting operation, the distance between the object to be measured (not illustrated) and the contactor 32a, the distance between the tip of the push pin 50 and the movable contact member 39 and the distance between the tip of the push pin 53 and the movable contact member 44 are respectively adjusted.

In the adjustment of the distance between the tip of the push pin 50 and the movable contact member 39, the adjusting shaft 48 is rotated and the distance between the tip of the push pin 50 and the movable contact member 39 is adjusted so as to correspond to the first measuring position. On the other hand, in the adjustment of the distance between the tip of the push pin 53 and the movable contact member 44, the adjusting shaft 51 is rotated and the distance between the tip of the push pin 53 and the movable contact member 44 is adjusted so as to correspond to the second measuring position.

As the adjusting shaft 48 for adjusting the displacement of the push pin 50 and the adjusting shaft 51 for adjusting the displacement of the push pin 53 project in the direction reverse to the projecting direction of the measuring shaft 32, the measurement preparing operation can be made easily.

After the adjusting operation the measurement will be started. At the time of starting the measurement, that is, when the object to be measured and the contactor 32a are separated from each other, the respective movable contact members 39 and 44 will separate from the tips of the respective corresponding push pins 50 and 53 and the respective movable contact members 39 and 44 will be in contact with the corresponding fixed contact members 38 and 43 respectively. Therefore, the first switching means formed of the fixed contact member 38, the movable contact member 39, the spring member 40 and the lid member 36 will be held closed and, at the same time, the second switching means formed of the fixed contact member 43, the movable contact member 44, the spring member 45 and lid member 36 will be held closed.

When the object to be measured relatively approaches the contactor 32a in the axial direction of the measuring shaft 32 until the object and contactor 32a are in contact with each other, by the contact of the object with the contactor 32a, the measuring shaft 32 will be pushed up toward the upper part of the housing 31 together with the movable body 35.

When the measuring shaft 32 reaches the first measuring position, the movable contact member 39 will be in contact with the tip of the push pin 50. When the measuring shaft 32 is further moved upward, the movable contact member 39 will be pushed downward while resisting the spring force of the spring member 40, therefore the movable contact member 39 and the fixed contact member 38 will separate from each other and the above mentioned first switching means will operate to open. On the other hand, the above mentioned second switching means will be held closed.

When the measuring shaft 32 is further moved and reaches the second measuring position, the movable contact member 44 will be in contact with the tip of the push pin 53. At the same time as the measuring shaft 32 is further moved upward, the movable contact member 44 will be pushed downward while resisting the spring force of the spring member 45, therefore the movable contact member 44 and the fixed contact member 43 will be separated from each other and the above-mentioned second switching means will operate to open.

Thus, just after the measuring shaft 32 passes the first measuring position, the above mentioned first switching means will open, whereas, just after the measuring shaft 32 passes the second measuring position, the above mentioned first switching means and second switching means will be held open.

For example, when the first measuring position is set as a lower limit of the prescribed dimensions of the object to be measured and the second measuring position is set as an upper limit of the prescribed dimensions of the object to be measured, it will be able to be measured whether the dimensions of this object to be measured are within the prescribed dimensions or not.

When the above mentioned first switching means and second switching means are closed, the first signal will be output to the outside device through the above mentioned first switching means, the second signal will be output through the above mentioned second switching means and it will be found from the outputs of the respective first and second signals that the dimensions of the object to be measured are below the lower limit dimensions.

When the above mentioned first switching means is closed but the above mentioned second switching means is opened, the above mentioned first signal will not be output but the above mentioned second signal will be output and therefore it will be found that the dimensions of the object to be measured are within the prescribed dimensions.

When the above mentioned first and second switching means are opened, the above mentioned first and second signals will not be output and therefore it will be found that the dimensions of the object to be measured exceed the upper limit dimensions of the prescribed dimensions.

By the way, in this embodiment, two switching means are provided. However, further three or more switching means can be provided. By combining the opening and closing operations of these switching means, the dimensions of the object to be measured can stepwise be measured.

Figure 6:
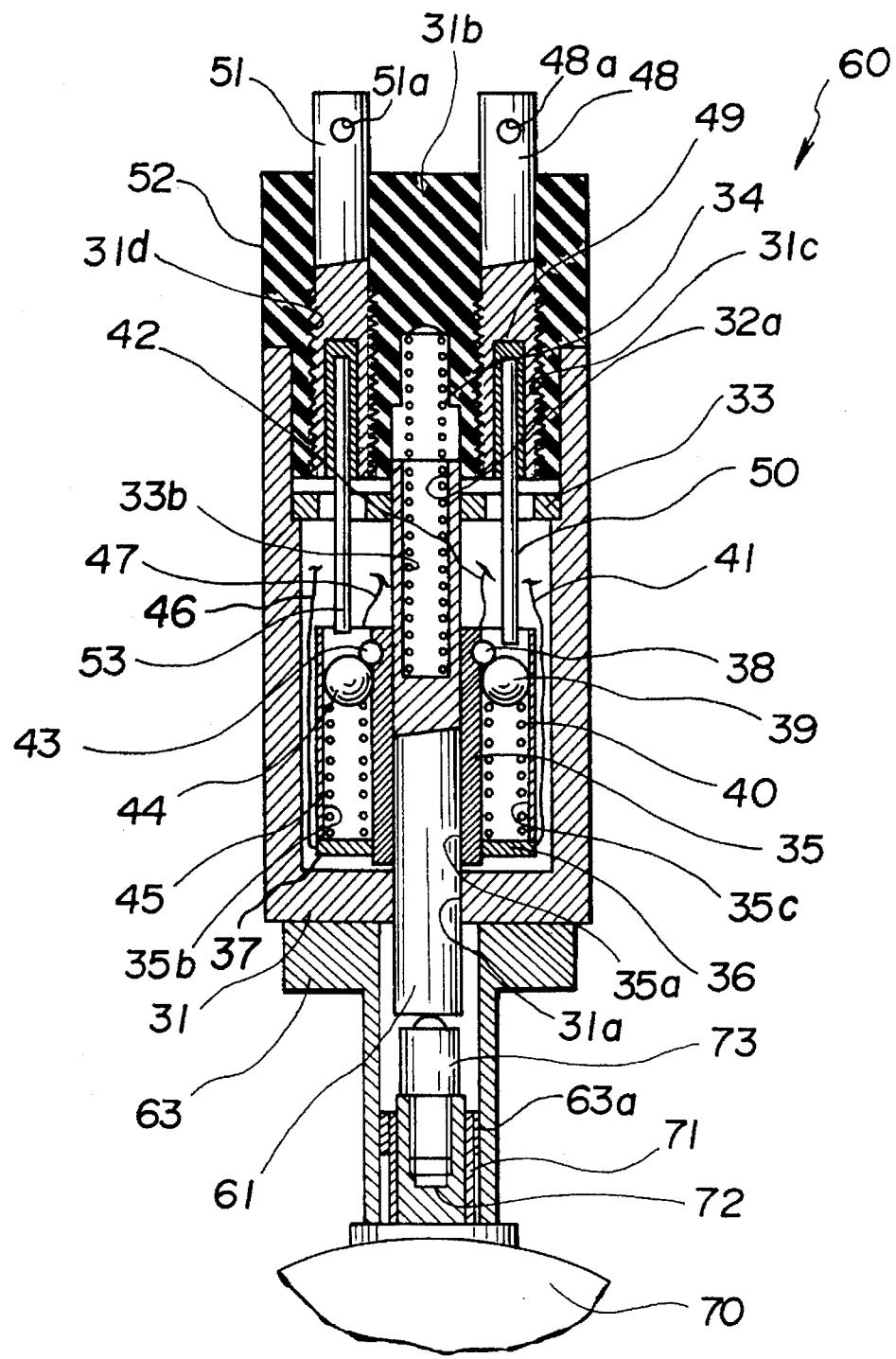
FIG. 6 is a vertically sectioned view showing the shaft position sensor in FIG. 1 as fitted to a dial gauge.

Another shaft position sensor shall be explained in the following with reference to the drawings. FIG. 5 is a view showing another embodiment of a shaft position sensor of the present invention as fitted to a dial gauge. FIG. 6 is a vertically sectioned view showing the embodiment as fitted in FIG. 5.

As shown in FIGS. 5 and 6, a shaft position sensor 60 fitted to a dial gauge 70 is provided with a housing 31.

As shown in FIG. 6, a measuring shaft 61 is contained within the housing 31, comprises a shaft member extending coaxially with the axis of the housing 31 and projects at the tip out of the housing 31 through a hole 31a. The portion with the hole 31a of the housing 31 forms a first bearing for the measuring shaft 61. The end surface at the tip of the measuring shaft 61 is formed to be plane. The measuring shaft 61 is slidably supported by the first bearing and a second bearing 33, and is pressed toward one end of the housing 31 by the spring force of a spring member 34.

The spring member 34 is inserted at one end into a hole 32b and is in contact at the other end with a lid member 31b of the housing 31.

A movable body 35 is fitted to the measuring shaft 61 and is provided with a hole 35a through which a measuring shaft 32 is inserted.

Two holes 35b, 35c extending coaxially with the axis of the hole 35a are provided in the peripheral part of the hole 35a of the movable body 35. The respective holes 35b, 35c on one side of the housing 31 are closed with segmental lid members 37 and 36 respectively.

A fixed contact member 38, a movable contact member 39 and a spring member 40 are contained in one hole 35c of the movable body 35. A lead wire 41 is connected to the lid member 36 and a lead wire 42 is connected to the fixed contact member 38. A first switching means is formed between the lead wires 41 and 42 and is formed of the fixed contact member 38, the movable contact member 39, the spring member 40 and the lid member 36.

A fixed contact member 43, a movable contact member 44 and a spring member 45 are contained in the other hole 35b of the movable body 35. A lead wire 46 is connected to the lid member 37. A lead wire 47 is connected to the fixed contact member 43. A second switching means is formed between the lead wires 46 and 47 and is formed of the fixed contact member 43, the movable contact member 44, the spring member 45 and the lid member 37.

An adjusting shaft 48 is screwed into screw hole 31c provided in the lid member 31b. A push pin 50 is fixed through an insulating member 49 at one end of the adjusting shaft 48. A hole 48a for receiving an adjusting tool is provided at the other end of the adjusting shaft 48.

The same as in screw hole 31c, an adjusting shaft 51 is screwed into the other screw hole 31d provided in the lid member 31b. A push pin 53 is fixed through an insulating member 52 at one end of the adjusting shaft 51. A hole 51a for receiving an adjusting tool is provided at the other end of the adjusting shaft 51.

A cylindrical attachment 63 extending coaxially with the measuring shaft 61 is fitted to the housing 31 at one end. The attachment 63 is fixed at one end to the housing 31. A female screw part 63a is formed on the inside surface of the attachment 63.

The female screw part 63a is screwed with a cap screw 71 provided in the upper part of the dial gauge 70. The cap screw 71 comprises a cylindrical upper member and has a male screw formed on the outer peripheral surface. A spindle 72 operatively connected to the measuring shaft (not illustrated) of the dial gauge 70 is inserted through the cap screw 71. A tip piece 73 is screwed at the tip into the spindle 72 and is in contact at the tip with the measuring shaft 61.

The operation of the shaft position sensor 60 shall be explained in the following.

When it is determined whether or not the dimensions of the object to be measured are within the prescribed dimensions, first of all, the dial gauge 70 will be fixed to the supporter (not illustrated). Then, the adjusting operation before starting the measurement is carried out. In this adjusting operation, the distance between the tip of the push pin 50 and the movable contact member 39 is adjusted so as to correspond to the first measuring position and the distance between the tip of the push pin 53 and the movable contact member 44 is adjusted so as to correspond to the second measuring position.

Then, the spindle 72 operatively connected with the measuring shaft of the dial gauge 70 pushes up the measuring shaft 61 and the above mentioned first and second switching means operate to open or close in response to the displacement of the measuring shaft 61. With the opening and closing operation of the first and second switching means, the output of the signal will be controlled and whether or not the dimensions of the object to be measured are within the range of the prescribed dimensions will be judged in response to the presence or absence of the output of the signal.

If a large force acts on the housing 31 at the time of the measurement operation, the measurement preparing operation or the like, a moment will be applied to the attachment 63, but, as the first switching means and the second switching means are arranged in parallel with each other, the length of the housing 31 will become small and the moment acting on the attachment 63 will not become large and therefore the damage of the attachment 63 will be able to be prevented.

By the way, in this embodiment, the sensor as fitted to the dial gauge provided with the cap screw is explained. However, the sensor can be fitted also to a dial gauge having no cap screw by using a jig or the like.

The sensor as fitted to the above described dial gauge provided with no cap screw shall be explained in the following with reference to the drawing. FIG. 7 is a view showing the shaft position sensor in FIG. 5 as fitted to another dial gauge.

As shown in FIG. 7, a shaft position sensor 60 is fitted by an attachment 64 to a dial gauge 74 provided with a lug 75 on the back surface and having a spindle (not illustrated) projecting out of the top. The attachment 64 has a cylinder part 64a receiving a measuring shaft (not illustrated) and spindle of the shaft position sensor 60 and a fitting arm part 64b provided in the cylinder part 64a. The fitting arm part 64b is provided with a fitting position adjusting slot 64c for receiving such fixture 65 as a wing nut for fixing the lug 75 and fitting arm 64b and a hole 64d for supporting the dial gauge 74 and shaft position sensor 60 on the supporter.

Figure 8:
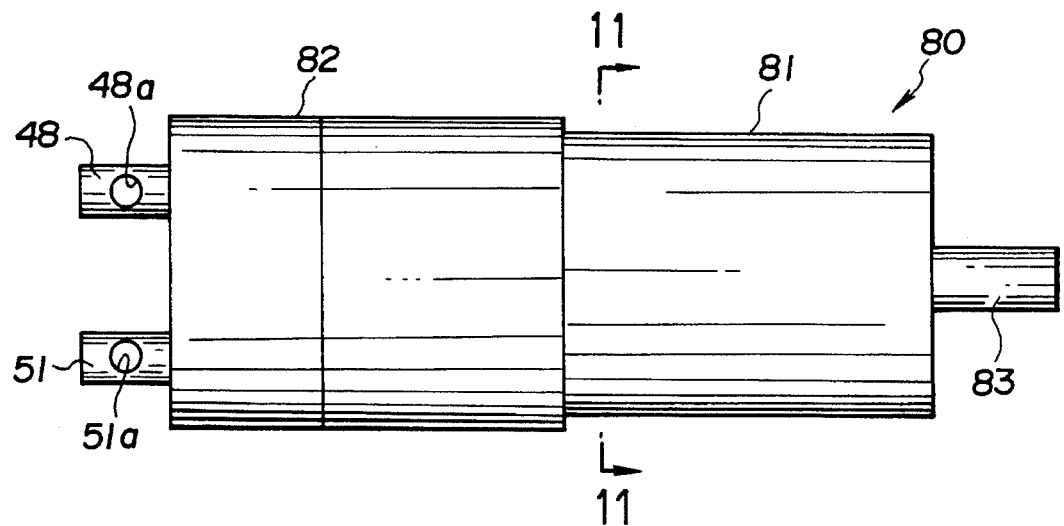
FIG. 8 is a side view showing a shaft position sensor of another embodiment of the present invention.
Figure 9:
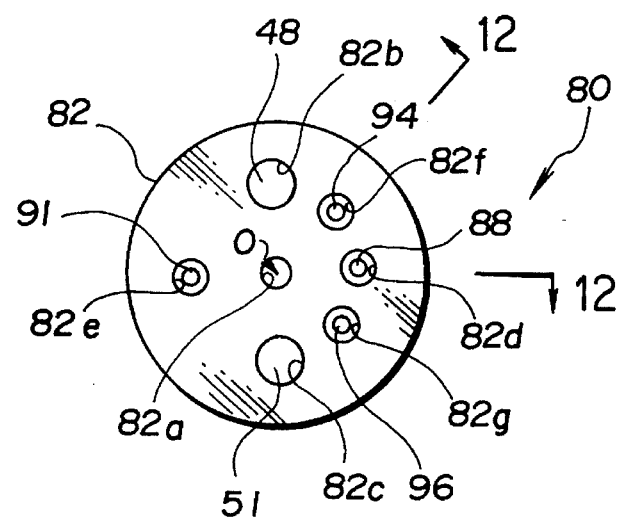
FIG. 9 is a back surface view showing the shaft position sensor in FIG. 8.
Figure 10:
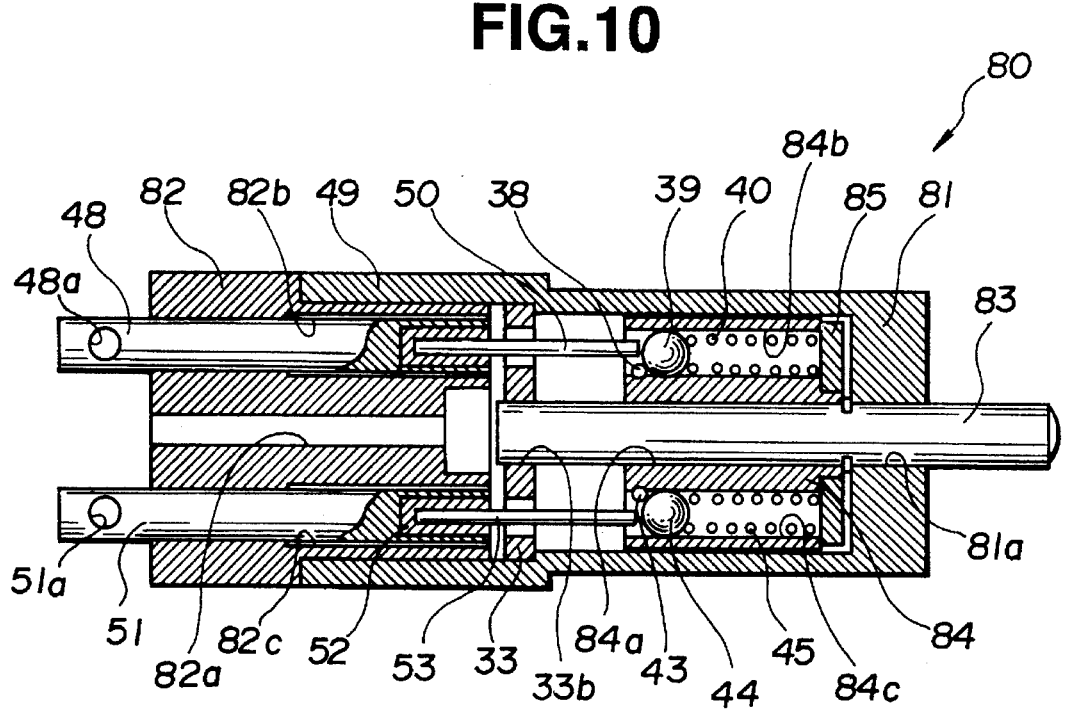
FIG. 10 is a vertically sectioned view showing the shaft position sensor in FIG. 8.
Figure 11:
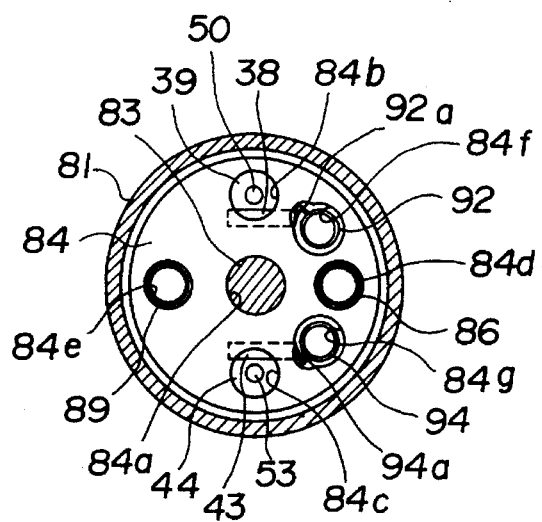
FIG. 11 is a vertically sectioned view obtained on line 11—11 in FIG. 8.
Figure 12:
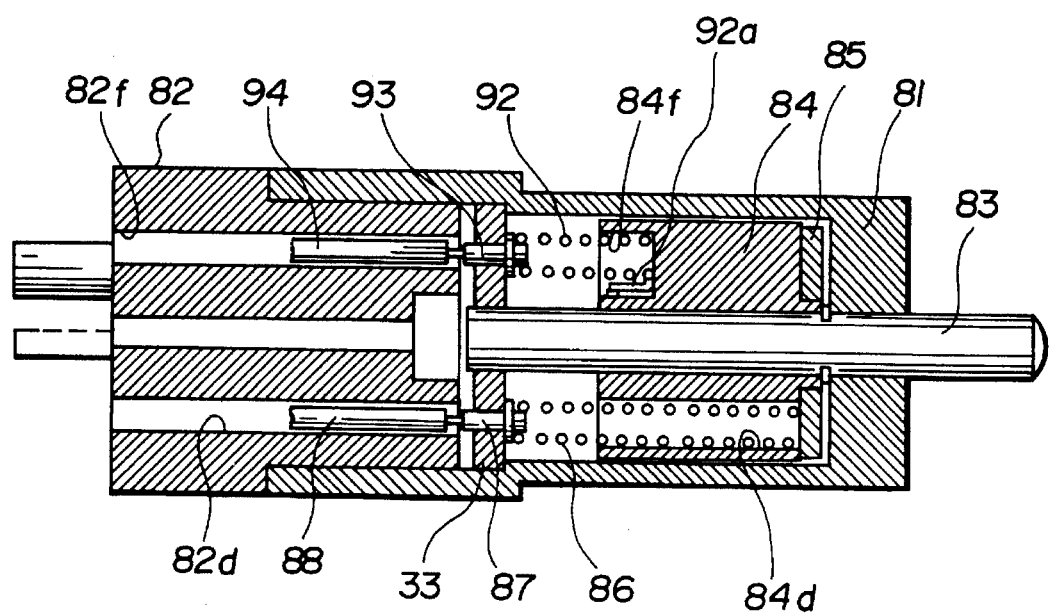
FIG. 12 is a sectioned view obtained on line 12-0-12 in FIG. 9.

Further, another shaft position sensor shall be explained in the following with reference to the drawings. FIG. 8 is a side view showing further another embodiment of a shaft position sensor of the present invention. FIG. 9 is a back surface view showing the back surface of the shaft position sensor in FIG. 8. FIG. 10 is a vertically sectioned view showing the shaft position sensor in FIG. 8. FIG. 11 is a sectioned view obtained on line 11—11 in FIG. 8. FIG. 12 is a sectioned view obtained on line 12-0-12 in FIG. 9.

As shown in FIGS. 8 to 12, the shaft position sensor 80 is provided with a housing 81 comprising a cylindrical member, provided at one end with a hole 81a and fitted at the other end with a lid member 82. The one end with the hole 81a of the housing 81 forms a first bearing. The lid member 82 is provided with a hole 82a extending from one end of the housing 81 toward the other end and a plurality of holes 82b, 82c, 82d, 82e, 82f and 82g (shown in FIG. 9) extending in the axial direction of the housing 81.

A measuring shaft 83 is contained within the housing 81, comprises a shaft member extending coaxially with the axis of the housing 81, projects at the tip out of the housing 81 through the hole 81a, is formed to be spherical on the end surface at the tip and is slidably supported by the first bearing and a second bearing 33.

A movable body 84 is fitted to the measuring shaft 83 and is provided with a hole 84a through which the measuring shaft 83 is inserted.

As shown in FIG. 11, a plurality of holes 84b, 84c, 84d, 84e, 84f and 84g extending in parallel with the axis of the hole 84a are provided in the peripheral part of the hole 84a of the movable body 84.

The holes 84b and 84c are arranged so as to oppose each other in the diametrical direction of the measuring shaft 83 and so as to respectively oppose the holes 82b and 82c of the lid member 82. The holes 84*d* and 84*e* are arranged so as to oppose each other in the diametrical direction of the measuring shaft 83 and so as to respectively oppose the holes 82*d* and 82*e* of the lid member 82 The hole 84*d* is arranged at an interval of 90 degrees with respect to the hole 84*b*.

The hole 84*f* is arranged between the holes 84*b* and 84*d* so as to oppose the hole 82*f* of the lid member 82. The hole 84*g* is arranged between the holes 84*d* and 84*c* so as to oppose the hole 82*g* of the lid member 82.

The respective holes 84*b*, 84*c*, 84*d* and 84*e* on one end side of the housing 81 are respectively closed with a segmental lid member 85 comprising an electroconductive plate.

A fixed contact member 38, a movable contact member 39 and a spring member 40 are contained in the hole 84*b* of the movable body 84. A fixed contact member 43, a movable contact member 44 and a spring member 45 are contained in the hole 84*c* of the movable body 84.

As shown in FIGS. 11 and 12, a spring member 86 for giving a measuring pressure to the measuring shaft 83 is inserted in the hole 84*d*. The spring member 86 is in contact at one end with the lid member 85 and at the other end with a spring receiving pin 87. The spring receiving pin 87 comprises an electroconductive member extending toward the hole 82*d* of the lid member 82 through the second bearing 33. A lead wire 88 is connected to the spring receiving pin 87 and is led out through the hole 82*d*.

In the same manner, as shown in FIGS. 11 and 12, a spring member 89 for giving a measuring pressure to the measuring shaft 83 is inserted in the hole 84*e*. The spring member 89 is in contact at one end with the lid member 85 and at the other end with the spring receiving pin (not illustrated). This spring receiving pin comprises an electroconductive member extending toward the hole 82*e* of the lid member 82 through the second bearing 33. A lead wire 91 is connected to the spring receiving pin and is led out through the hole 82*e*, as shown in FIG. 9.

An electroconductive spring member 92 is inserted in the hole 84*f*, is in contact at one end 92*a* with the movable body 84, is electrically connected to the fixed contact member 38 and is in contact at the other end with a spring receiving pin 93. The spring receiving pin 93 comprises an electroconductive member extending toward the hole 82*f* of the lid member 82 through the bearing 33. A lead wire 94 is connected to the spring receiving pin 93 and is led out through the hole 82*f*.

In the same manner, an electroconductive spring member 92 is inserted in the hole 84*g*, is in contact at one end 92*a* with the movable body 84, is electrically connected to the fixed contact member 43 and is in contact at the other end with a spring receiving pin (not illustrated). This spring receiving pin comprises an electroconductive member extending toward the hole 82*g* of the lid member 82 through the second bearing 33. A lead wire 96 is connected to the spring receiving pin and is led out through the hole 82*g* as shown in FIG. 9.

A first switching means is formed between the lead wires 94 and 88 and is formed of the spring receiving pin 93, the spring member 92, the fixed contact member 38, the movable contact member 39, the spring member 40, the lid member 85, the spring member 86 and the spring receiving pin 87. On the other hand, a second switching means is formed between the lead wires 96 and 91 and is formed of the spring receiving pin (not illustrated), the spring member 92, the fixed contact member 43, the movable contact member 44, the spring member 45, the lid member 85, the spring member 89 and the spring receiving pin (not illustrated). By the way, either the lead wire 88 or 91 will be able to be eliminated.

As shown in FIG. 10, an adjusting shaft 48 for adjusting the separated positions of the fixed contact member 38 and movable contact member 39 is screwed into a screw hole 82*b* provided in the lid member 82 and a push pin 50 is fixed through an insulating member 49 at one end of the adjusting shaft 48. A hole 48*a* for receiving an adjusting tool is provided at the other end of the adjusting shaft 48.

The same as in the screw hole 82*b*, an adjusting shaft 51 for adjusting the separated positions of the fixed contact member 43 and movable contact member 44 is screwed into a screw hole 82*c* provided in the lid member 82. A push pin 53 is fixed through an insulating member 52 at one end of the adjusting shaft 51. A hole 51*a* for receiving an adjusting tool is provided at the other end of the adjusting shaft 51.

By the above, with the movement of the movable body 84, the respective lead wires connected to the respective switching means will not be moved and the elongation and flexure of the respective lead wires will be able to be eliminated. Therefore, lead wires can be prevented from being broken by the elongation and flexure of the respective lead wires, the moving operation of the measuring shaft 83 can be prevented from being obstructed by the respective lead wires and a high reliability can be obtained.

By the way, in this embodiment, two switching means are provided. However, more switching means can also be provided.

In this embodiment, four spring members for forming respective switching means are used as spring members for generating the measuring pressure of the measuring shaft. However, respective switching means can be formed of less spring members and the measuring pressure can be generated. For example, the spring member 86 will be able to be eliminated.

Figure 13:
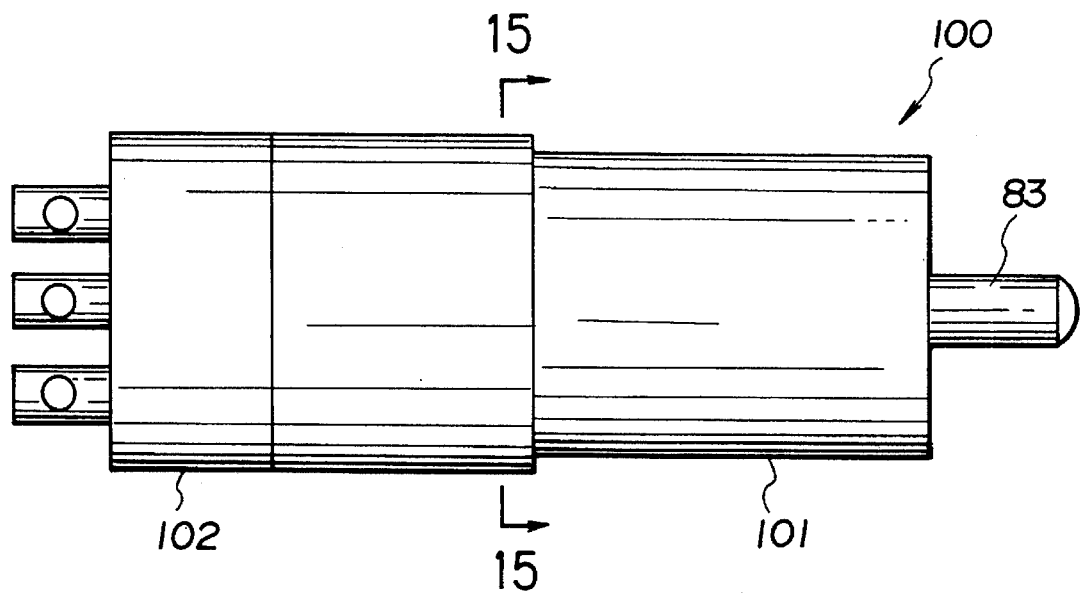
FIG. 13 is a side view showing a shaft position sensor of a third embodiment of the present invention.
Figure 14:
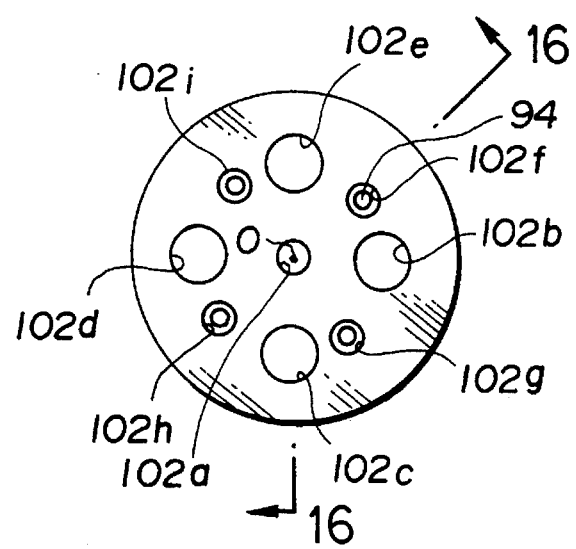
FIG. 14 is a back surface view showing the shaft position sensor in FIG. 13.
Figure 15:
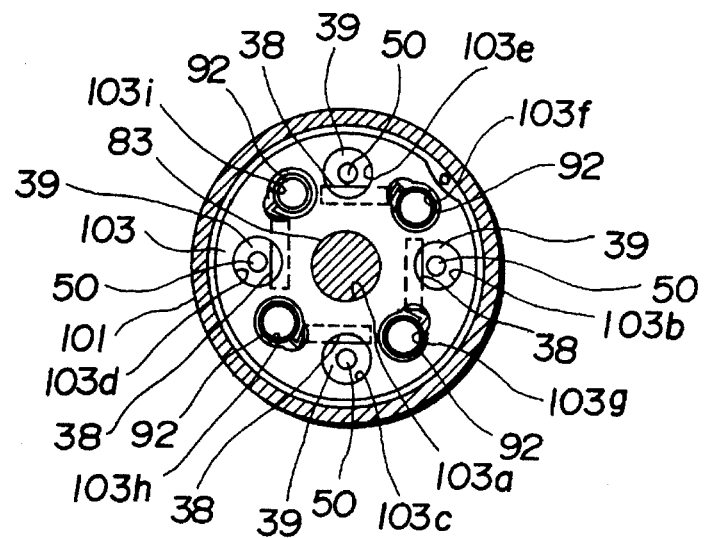
FIG. 15 is a sectioned view obtained on line 15—15 in FIG. 13.
Figure 16:
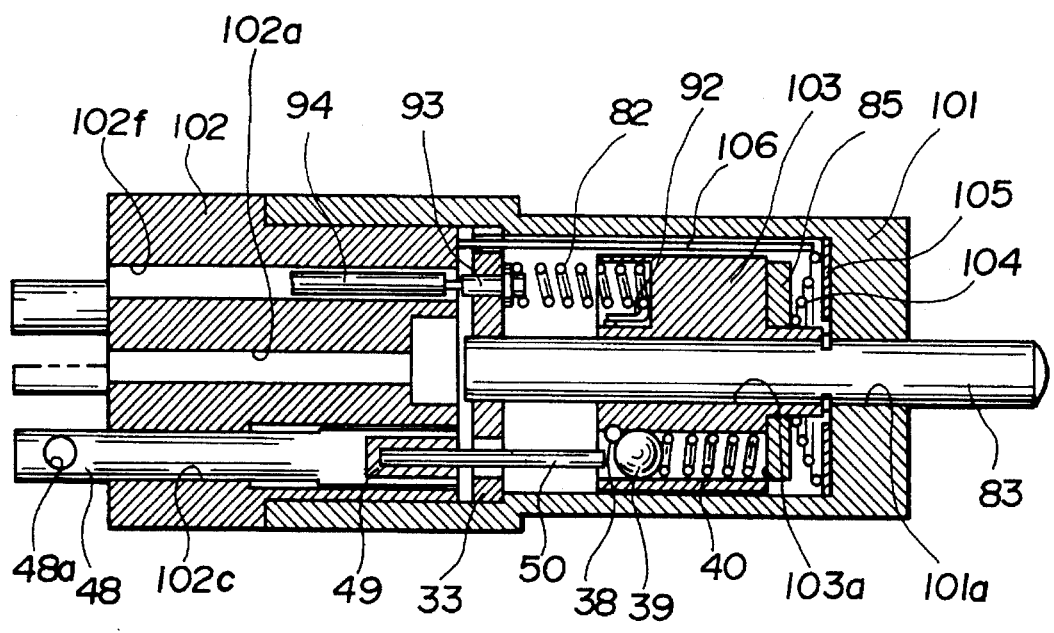
FIG. 16 is a sectioned view obtained on line. 16-0-16 in FIG. 14.
Figure 17:
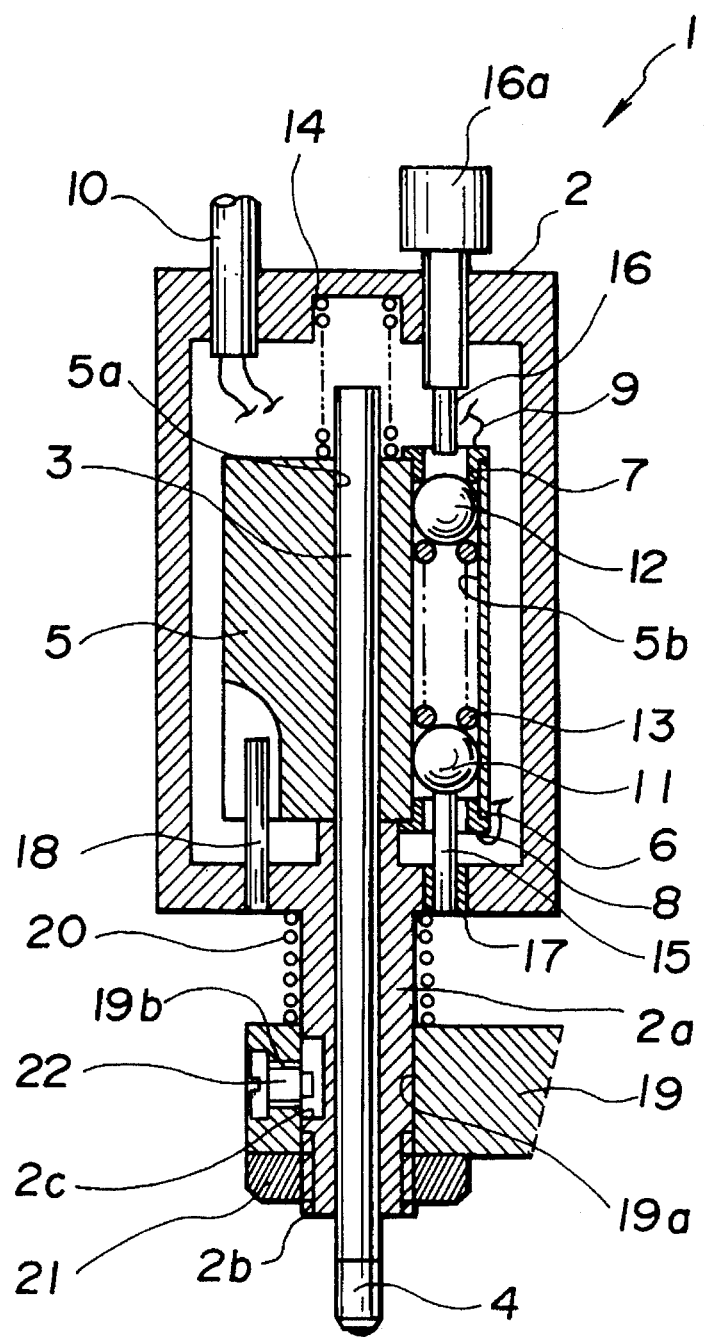
FIG. 17 is a vertically sectioned view showing a conventional shaft position sensor.
Figure 18:
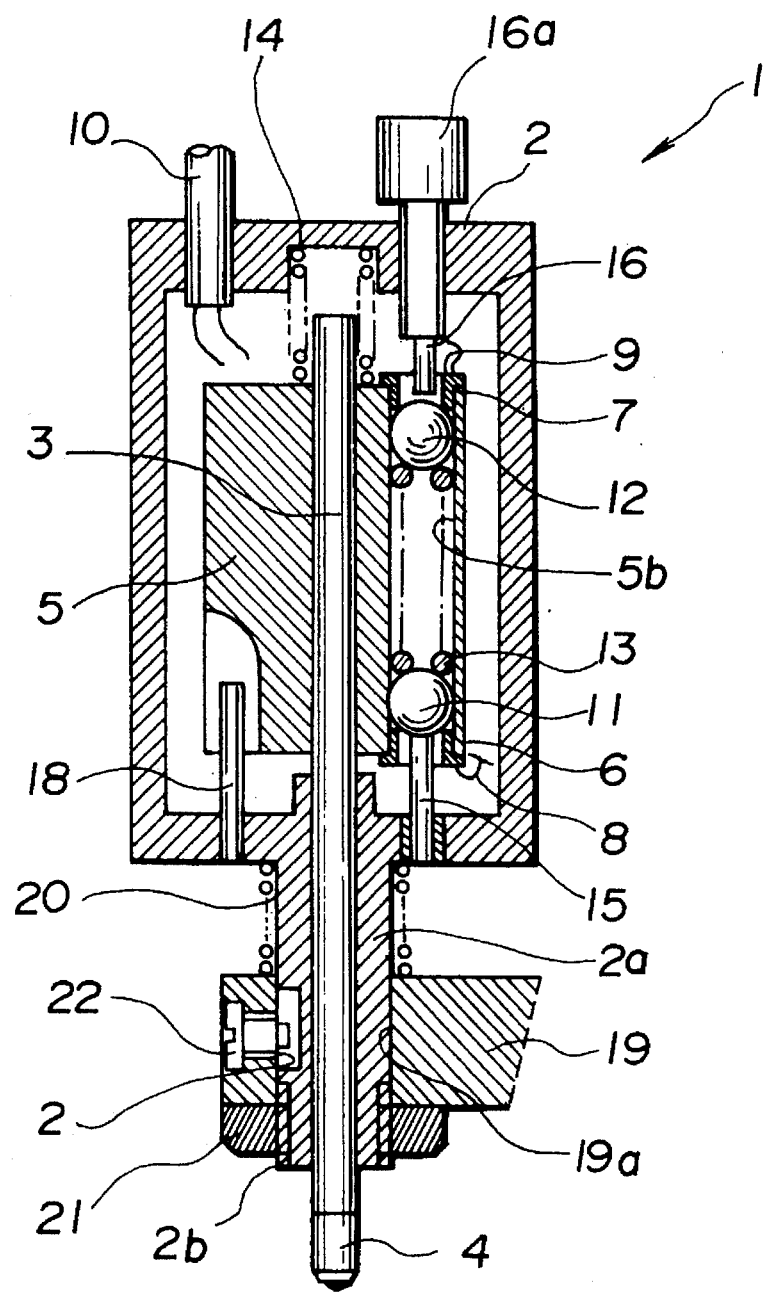
FIG. 18 is a view showing the first operating state of the shaft position sensor in FIG. 17.
Figure 19:
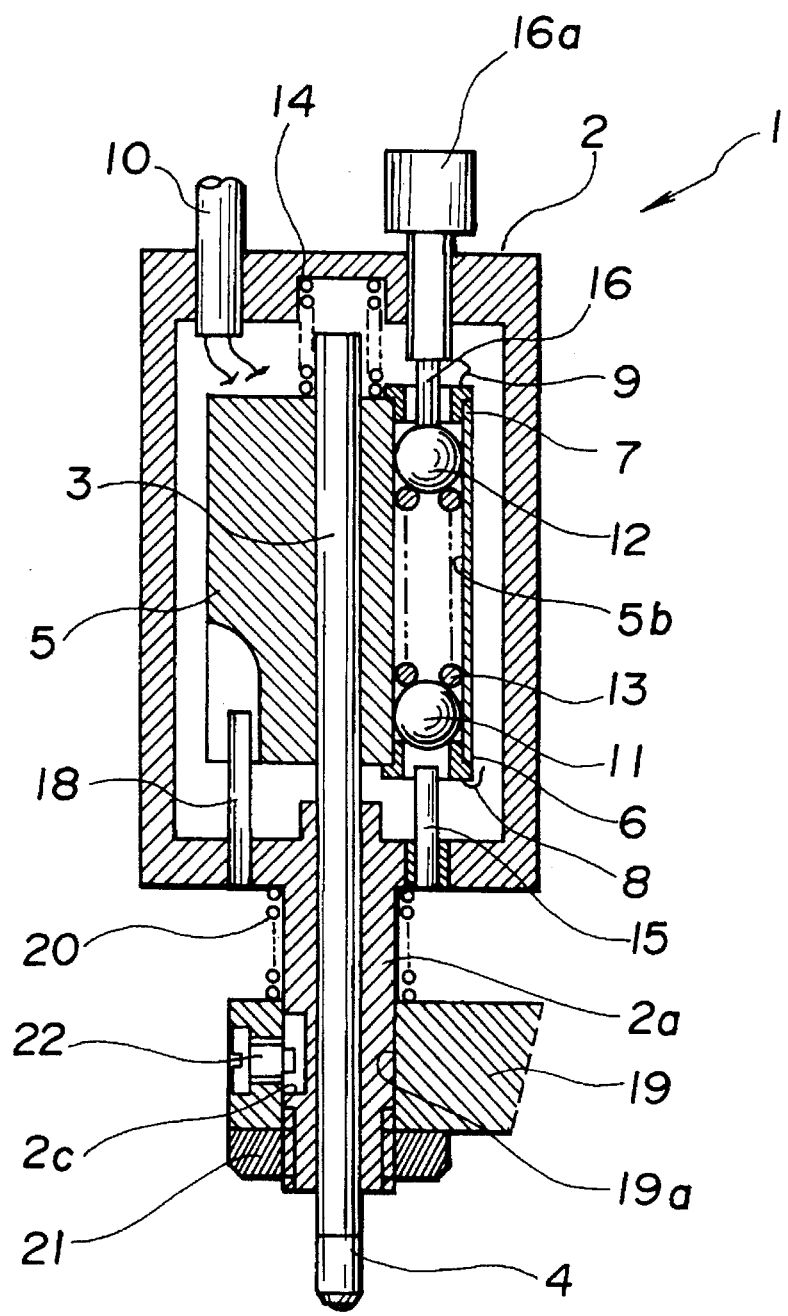
FIG. 19 is a view showing the second operating state of the shaft position sensor in FIG. 17.

A shaft position sensor provided with more switching means shall be explained with reference to the drawings. FIG. 13 is a side view showing further another embodiment of a shaft position sensor of the present invention. FIG. 14 is a back surface view showing the shaft position sensor in FIG. 13. FIG. 15 is a sectioned view obtained on line 15—15 in FIG. 13. FIG. 16 is a sectioned view obtained on line 16-0-16 in FIG. 14.

As shown in FIGS. 13 to 16, a shaft position sensor 100 is provided with a housing 101 comprising a cylindrical member, provided at one end with a hole 101*a* and fitted at the other end with a lid member 102. The one end with the hole 101*a* forms a first bearing. The lid member 102 is provided with a hole 102*a* extending from one end of the housing 101 toward the other end and a plurality of holes 102*b*, 102*c*, 102*d*, 102*e*, 102*f*, 102*g*, 102*h* and 102*i* (shown in FIG. 14) extending in the axial direction of the housing 101.

A measuring shaft 83 is contained within the housing 101, comprises a shaft member extending coaxially with the axis of the housing 101, projects at the tip out of the housing through the hole 101*a*, is formed to be spherical on the end surface at the tip and is slidably supported by the first bearing and a bearing 33.

The measuring shaft 83 is fitted with a movable body 103 provided with a hole 103*a* through which the measuring shaft 83 is inserted.

As shown in FIG. 15, a plurality of holes 103*b*, 103*c*, 103*d*, 103*e*, 103*f*, 103*g*, 103*h* and 103*i* extending in parallel with the axis of the hole 103a are provided in the peripheral part of the hole 103a of the movable body 103.

The respective holes 103b, 103c, 103d and 103e are arranged at intervals of 90 degrees. In the same manner, the respective holes 103f, 103g, 103h and 103i are arranged at intervals of 90 degrees.

The respective holes 103b, 103c, 103d and 103e are closed on one end side of the housing 101 with a segmental lid member 85 comprising an electroconductive plate.

A fixed contact member 38, a movable contact member 39 and a spring member 40 are contained in each of the respective holes 103b, 103c, 103d and 103e.

A spring member 92 for giving a measuring pressure to the measuring shaft 83 is inserted in each of the respective holes 103f, 103g, 103h and 103i. The spring member 92 comprises an electroconductive spring member, is in contact at one end with the movable body 103, is electrically connected to the fixed contact member 38 and is in contact at the other end with a spring receiving pin 93. Each spring receiving pin 93 comprises an electroconductive member extending toward the corresponding hole 102f, 102g, 102h or 102i of the lid member 102 through the second bearing 33. A lead wire 94 is connected to each spring receiving pin 93 and is led out through the corresponding hole 102f, 102g, 102h or 102i.

A conical spring member 104 in contact at one end with the lid member 85 and a washer 105 with which the spring member 104 is in contact are arranged between the lid member 85 of the movable body 103 and the housing 101. The spring member 104 comprises an electroconductive spring member.

A lead wire 106 is connected to the washer 105 in the edge part and is led out along the inside wall of the housing 101 through the bearing 33.

A first switching means is formed between the lead wire 94 led to the hole 102f and the lead wire 106 and is formed of the spring receiving pin 93, spring member 92, fixed contact member 38, movable contact member 39, spring member 40, lid member 85, spring member 104 and washer 105 contained in the hole 103e.

In the same manner, a second switching means is formed between the lead wire 94 led to the hole 102g and the lead wire 106, a third switching means is formed between the lead wire 94 led to the hole 102h and the lead wire 106 and a fourth switching means is formed between the lead wire 94 led to the hole 102i and the lead wire 106, provided without enlarging the dimensions of the contour of the housing.

By the above, as the measuring pressure for the measuring shaft 83 is generated by the spring member 104, the number of spring members can be reduced and the housing 101 can be prevented from becoming large in the contour dimensions. Also, as the lead wire 105 is not operatively connected with the movement of the movable body 103, the elongation and flexure of the lead wire 105 can be eliminated and a smooth measuring operation can be obtained. Further, three or more switching means can be provided without enlarging the dimensions of the contour of the housing.

As explained above, according to the shaft position sensor of the present invention, the damage in the fitting position to another supporter by a large force can be prevented, the type can be made small, the measurement preparing operation can be simply made, the measuring operation is not a trouble and further the shaft position sensor can be fitted to a dial gauge so as to be operatively connectably fitted to the measuring shaft of the dial gauge.

As many apparently widely different embodiments of this invention may be made without departing from the spirit and scope thereof, it is to be understood that the invention is not limited to the specific embodiments thereof except as defined in the appended claims.

What is claimed is:

1. A shaft position sensor to be used to measure the dimensions of the shape of an object to be measured or to sense the displacement of the object, comprising:

a housing in which a bearing is provided;

a measuring shaft having a tip projecting out of said housing and slidably supported by the bearing of said housing;

a biasing means for biasing said measuring shaft toward said tip;

a plurality of switching means for operating to open or close in response to the displacement of said measuring shaft and arranged in parallel along the periphery of said measuring shaft;

a non-pivotable movable body fixed to said measuring shaft, said movable body containing said plurality of switching means in parallel with said measuring shaft; and a switch operating position adjusting means for adjusting the opening and closing positions of said plurality of switching means.

2. A shaft position sensor according to claim 1 wherein said measuring shaft projects out of a first end surface of said housing and said switch operating position adjusting means has an adjusting shaft projecting out of a second end surface opposed to said first end surface of said housing and adjusting the opening and closing positions of said plurality of switching means.

3. A shaft position sensor according to claim 1 wherein said switching means has a fixed contact member provided in said movable body and a movable contact member movably fitted to said movable body and electrically contacting with or separating from said fixed contact member in the opening and closing operating position adjusted by said switch operating position adjusting means.

4. A shaft position sensor according to claim 3 wherein said switching means has a first spring member pressing said movable contact member toward said fixed contact member.

5. A shaft position sensor according to claim 4 wherein said switching means has a second spring member having an electroconductivity and said second spring member is electrically connected at one end to said fixed contact member and at the other end to a lead wire.

6. A shaft position sensor according to claim 5 wherein said second spring member produces a biasing force for generating the measuring pressure of said measuring shaft.

7. A shaft position sensor to be used to measure the dimensions of the shape of an object to be measured or to sense the displacement of the object, comprising:

a housing in which a bearing is provided;

a measuring shaft having a tip projecting out of said housing and slidably supported by the bearing of said housing;

a biasing means for biasing said measuring shaft toward said tip;

a plurality switching means for operating to open or close in response to the displacement of said measuring shaft, said plurality of switching means being arranged in parallel along the periphery of said measuring shaft;

a non-pivotable movable body fixed to said measuring shaft, said movable body containing said plurality of switching means in parallel with said measuring shaft;

a switch operating position adjusting means for adjusting the opening and closing positions of said plurality of switching means; and a connecting means for connecting a spindle projecting from above a housing of a dial gauge used to measure the dimensions of said object to be measured with said measuring shaft.

8. A shaft position sensor according to claim 7 wherein said connecting means has a female screw-threaded attachment to be screwed with a male screw formed on a cap of said dial gauge.

9. A shaft position sensor according to claim 7 wherein said connecting means has a connecting member connecting a lug provided on a back surface of said housing of said dial gauge.

* * * * *